June 10, 1958
L. C. WEBB
2,838,033
COMBINATION HOT AIR AND INTERNAL COMBUSTION
ENGINE INCORPORATING IMPROVED HOT AIR VALVE
MEANS TO THE POWER CYLINDERS
Filed Oct. 15, 1957
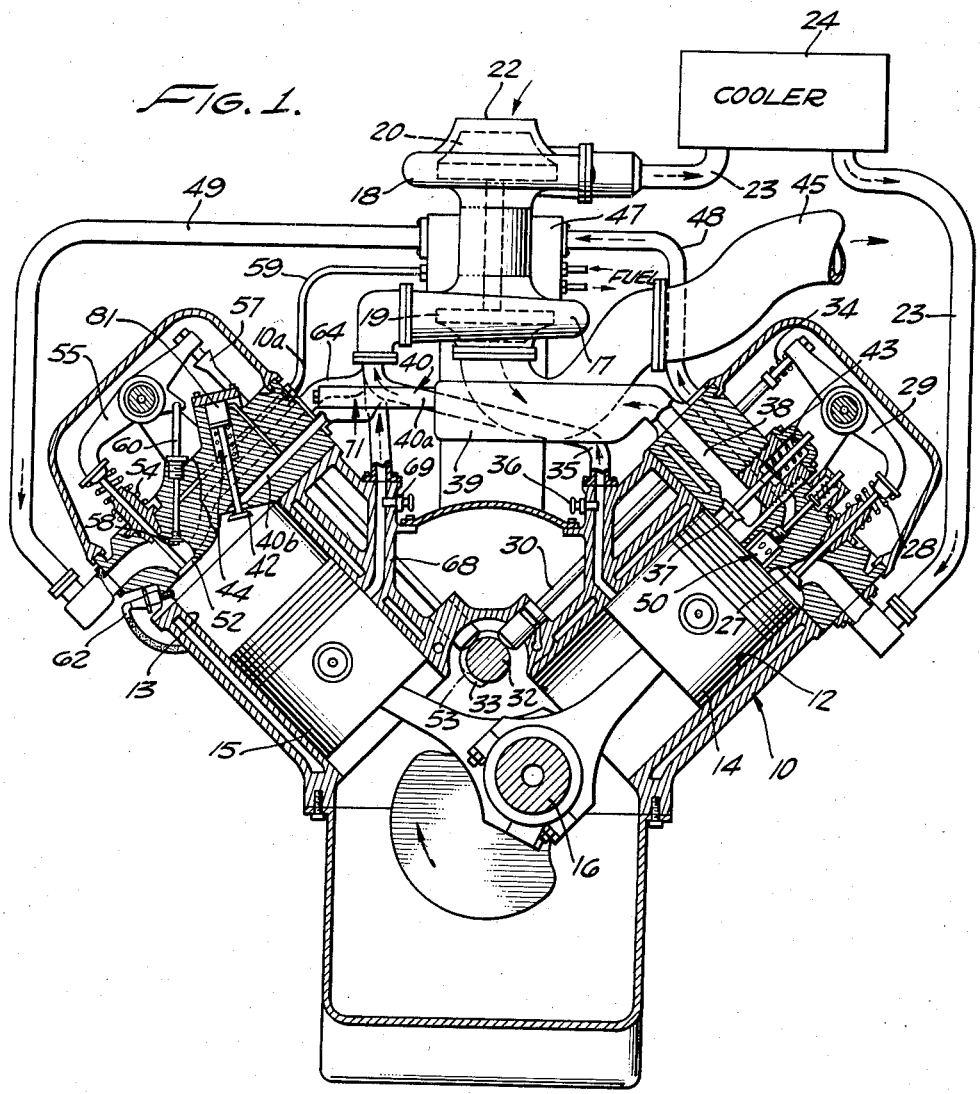
FIG. 1.
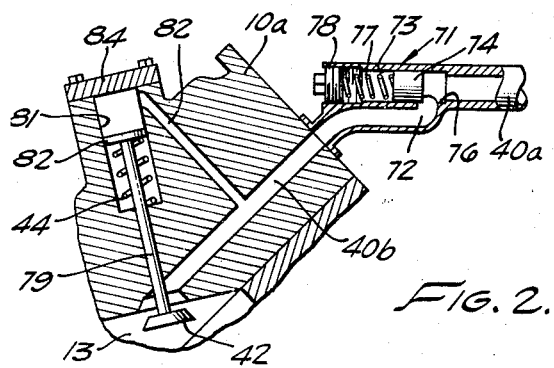
FIG. 2.
LEON C. WEBB
INVENTOR.
BY
ATTORNEYS United States Patent Office 2,838,033
Patented June 10, 1958

2,838,033

COMBINATION HOT AIR AND INTERNAL COMBUSTION ENGINE INCORPORATING IMPROVED HOT AIR VALVE MEANS TO THE POWER CYLINDERS

Leon C. Webb, Van Nuys, Calif., assignor of thirty-five percent to Clara M. Long, Van Nuys, Calif.

Application October 15, 1957, Serial No. 690,282

9 Claims. (Cl. 123—26)

This invention relates to a combination hot air and internal combustion engine, and more particularly to an improved valve and valve-actuating means therefor. The present invention constitutes a continuation in part of my co-pending patent application, Serial No. 585,214, filed May 16, 1956, for a Combination Hot Air and Internal Combustion Engine.

In my above-cited co-pending patent application, there is described and claimed an engine which constitutes a great improvement over prior art structures as regards operating characteristics and overall efficiency. Except for the valve and valve-operating means, at the hot air inlet to the power cylinders, the present engine is identical to the one described in detail in the above-mentioned patent application. Reference is accordingly made to such patent application for the details of construction of parts other than the valve and valve-operating means at the hot air inlet to the power cylinders.

It is an object of the present invention to provide a combination hot air and internal combustion engine, and a hot air inlet valve and valve-operating means therein, characterized by improved efficiency, improved operation, shorter valve travel, and increased reliability of operation as compared to prior art valves and engines.

Another object of the present invention is to provide a pressure operated valve adapted to produce an improved booster operation relative to the power pistons of the engine, thereby resulting in increased efficiency.

A further object of the invention is to provide a hot air intake valve to the power cylinder which is adapted to open sooner after the explosion in the power cylinder than the corresponding valve described in the above-cited application, thereby resulting in increased average pressure in the power cylinder during the downstroke of the power piston.

These and other objects and advantages of the invention will be more fully set forth in the following specification and claims, which are to be considered in connection with the attached drawing to which they relate.

In the drawing:

Figure 1 is a transverse sectional view of an engine constructed in accordance with the present invention, as viewed from the front of the automobile or other vehicle in which the engine is mounted, the showing being largely schematic; and Figure 2 is an enlarged fragmentary sectional view illustrating the valve and valve-operating means at the hot air intake to the power cylinder.

As in the case of the specification of my above-cited co-pending application, the present description will be written as though there were only one compressor piston and cylinder, and one corresponding power piston and cylinder. It is to be understood, however, that the present engine is actually a V-8 engine having four compressor cylinders and four power cylinders. The remaining compressor and power cylinders and associated parts, which are not shown or described herein, are identical to the compressor and power cylinders (and associated parts) which are shown and described.

Proceeding first to a general description of the engine, it is illustrated to comprise an engine block 10 having formed therein a compressor cylinder 12 and a power cylinder 13. The compressor and power cylinders are arranged at a 90° angle relative to each other, so that their pistons will be in 90° out-of-phase relationship. The compressor and power pistons, numbered 14 and 15 respectively, are connected to a standard crankshaft 16 which is adapted to rotate clockwise as viewed in Figure 1. The pistons 14 and 15 for the corresponding cylinders 12 and 13 are connected to the same crank of the crankshaft 16, it being understood that the remaining unshown pistons are connected to unshown crank portions of the crankshaft. With the described arrangement, the power piston 15 is 90° ahead of the compressor piston 14, and arrives at top dead center 90° prior to arrival of the compressor piston at top dead center.

Except as will be specifically described hereinafter, the illustrated engine is constructed in the same manner as standard V-8 engines. Thus, the cooling system, oil system, etc., are substantially the same as in ordinary V-8 engines. It is to be understood, however, that the concepts of the invention are not necessarily limited to V-8 engines since they may be incorporated in certain other types.

A suitable turbo-compressor unit is provided, having a turbine portion 17 and a compressor portion 18. The turbo-compressor may have one or more stages of compression, in accordance with conventional design, and preferably comprises turbine and compressor rotors 19 and 20 mounted on a common shaft within a common housing. Compressor portion 18 is adapted to draw air through an inlet 22 and discharge heated compressed air into a pipe or conduit 23 leading to the compressor cylinder 12. Preferably, a suitable cooler 24 is interposed in conduit 23 in order to cool the air prior to its introduction into the cylinder.

The flow of compressed air from conduit 23 into cylinder 12 is controlled by a poppet valve 27 which is normally urged to seated or closed position by a compression spring 28. A conventional rocker arm 29 and push rod 30 are employed to associate the valve 27 with the camshaft 32 of the engine. Camshaft 32 is of conventional design except that it is driven at the same rotational speed as crankshaft 16, instead of at a 2-to-1 ratio relative to the crankshaft as is the case with conventional four-cycle engines. Mounted on the crankshaft is a relatively long, unpeaked cam 33 which is associated with push rod 30 and is so adjusted that poppet valve 27 will be open during the downstroke of piston 14 and will be closed during the major portion of its upstroke. Preferably, the cam 33 is so constructed and mounted that valve 27 will open approximately 10 degrees after top dead center (T. D. C.), and will close approximately 30 degrees after bottom dead center (B. D. C.).

Push rod 30 should be associated with rocker arm 29 by means of a sliding connection and a compression spring 34. With such construction, intake poppet 27 will not open when there is an excessively high pressure in cylinder 12, despite the fact that cam 33 is attempting to effect poppet opening. The poppet 27 will, however, open as soon as the cylinder pressure reduces sufficiently, the relatively strong spring 34 plus the pressure in conduit 23 then overcoming the spring 28 and the pressure in the cylinder.

When poppet 27 is open, air pressure from compressor 18 acts against the top of piston 14 and imparts a substantial amount of power to crankshaft 16 during substantially the entire piston downstroke. As the piston approaches bottom dead center, its upper surface moves by and thus opens an exhaust port or conduit 35, the latter communicating with the inlet of turbine portion 17 of the turbo-compressor. The location of conduit 35 is such that air may flow therethrough from a time when the piston is approximately 20 degrees before bottom dead center, to a time when the piston is approximately 20 degrees after bottom dead center. The flow of air through exhaust port or conduit 25, which may be termed a uniflow, may be controlled by a suitable valve 36.

After the piston 14 on its upstroke has blocked the uniflow or exhaust conduit 35, the air in cylinder 12 is subjected to a very substantial compression and heating effect. Outward flow of the resulting hot compressed air is controlled by an unloader or outlet valve 37, the latter communicating through a pipe or conduit 38 with a reservoir chamber 39. Chamber 39 is, in turn, connected through a conduit 40 to cylinder 13, the flow into the cylinder being controlled by a valve 42 and by other valve means to be described hereinafter. Each compressor cylinder is directly connected to its associated power cylinder by elements 38—40, there being no manifolds in such connections.

The valve 42 and operating means therefor forms the primary subject matter of the present application, and will be described in detail hereinafter. With relation to the out-flow valve 37, it is so constructed as to be normally held closed by a spring 43, but is opened when the pressure in cylinder 12 becomes sufficiently high. Conversely, as will be described hereinafter, inflow valve 42 is normally held seated by a spring 44, and is shifted to open position when the pressure in conduit 40 becomes sufficiently high in comparison to the pressure inside the power cylinder. It is pointed out that the described constructions of the valves 37 and 42 permit air to flow only in a direction from cylinder 12 to cylinder 13, and not in the reverse direction, this being because the valves are so seated that they act as one-way valves.

Proceeding next to a description of the means for delivering the desired fuel-air mixture to power cylinder 13, and to the means for exhausting air and products of combustion from the power cylinder, a fuel-air proportioning valve 47 is connected by a conduit 48 to compressor cylinder 12, and by a conduit 49 to power cylinder 13. Compressed air from cylinder 12 is thus passed, under the control of a suitable pressure regulating valve 50, through the proportioning valve 47 to the power cylinder. Introduction of air into the power cylinder is under the control of a poppet valve 52 operated by a cam 53 on camshaft 32. The poppet 52 which controls the inflow of air (and fuel) into power cylinder 13 is urged to seated position by a compression spring 54 and is adapted to be opened by a conventional rocker arm 55. Arm 55 is, in turn, operated by a push rod 57 which is periodically engaged by the cam 53 to effect valve opening. The cam 53 is relatively short and peaked, as compared to cam 33, so that the poppet 52 is only open for a short period of time before power piston 15 reaches top dead center. Cam 53 may be so constructed that poppet 52 opens at 85 degrees before top dead center and closed at 40 degrees before top dead center.

At the same time that poppet 52 is opened, fuel is introduced into conduit 49, at a point adjacent the poppet 52, from an injector nozzle 58 which is connected by a fuel line 59 to proportioning valve 47. Flow of fuel to injector nozzle 58 is controlled by a valve or piston rod 60 which is connected to a crank on rocker arm 55. Valve rod 60 is adapted, when the rocker arm 55 is shifted to open poppet 52, to permit flow of fuel through line 59. When the rocker arm is shifted to close poppet 52, rod 60 blocks flow of fuel through line 59. The valve rod is thus so constructed and arranged that fuel is injected through nozzle 58 during the time that poppet 52 is open, and at no other time. Such direct relationship between the fuel injector and the rocker arm for inlet valve 52 results in great simplicity of operation and manufacture, and in extreme reliability and efficiency of use.

After introduction of the fuel-air mixture, the poppet 52 closes and further upward movement of power piston 15 effects compression of such mixture until the power piston reaches top dead center. When the power piston reaches top dead center, or a point slightly in advance thereof, the fuel-air mixture is ignited by a spark from a spark plug 62 which is provided in the cylinder 13, adjacent poppet 52. The spark plug 62 is supplied with electricity by a conventional distributor, not shown, but one which is adapted to supply sparks to four cylinders only and once during each downstroke of the pistons in such cylinders instead of once during each alternate upstroke, as is the case with conventional V-8 engines.

The resulting explosion of the fuel-air mixture supplies a large amount of power to the downwardly moving power piston 15, due to the high initial pressure of the expanding combustion products. This pressure is supplemented and maintained, as will be described subsequently, by the hot air introduced through the valve 42 when the same is opened by its operating means, to be described hereinafter. As the power piston 15 approaches the bottom of its stroke, a cam-operated exhaust poppet valve, not shown, is opened to permit exhausting of gases from the upper end of the power cylinder and through a conduit 64 to the inlet to turbine 17. The exhaust poppet is normally held seated by a compression spring, and is actuated to open position by a rocker arm which is operated by a suitable unshown push rod and a cam on camshaft 32. Such cam is so constructed that exhaust poppet 52 will open approximately 60° before bottom dead center, and will close approximately 80° before top dead center.

In order to provide an extremely rapid and efficient scavenging of combustion products and air from power cylinder 13, a uniflow exhaust conduit 68 is connected to the power cylinder at a point relatively adjacent the upper surface of piston 15 when the piston is at bottom dead center. The uniflow 68 is opened approximately 45 degrees before bottom dead center and is closed approximately 45 degrees after bottom dead center. A control valve 69 is preferably provided in uniflow conduit 68 in order to regulate the flow of exhaust products therethrough.

As in the case of uniflow 35 and exhaust conduit 64, uniflow conduit 68 connects to the inlet of turbine 17. It follows that exhaust products from all three of these conduits flow radially inwardly through the turbine rotor 19 to effect rotation thereof, after which they flow axially outwardly through the turbine exhaust 45. In order to aid in the scavenging action, the outlets of all of the exhaust conduits 35, 64, and 68 are preferably directed toward the turbine 17 and are so constructed as to provide an aspirating or jet effect.

Proceeding next to a detailed description of the valve 42 and operating means therefor, and referring particularly to Figure 2, it is pointed out that the conduit 40 from reservoir 39 has interposed therein a valve housing 71 which is suitably mounted on the cylinder head 10a. The conduit portion between housing 71 and reservoir 39 is designated 40a, and the conduit portion downstream of housing 71 is numbered 40b. The valve housing 71 is provided with a passage 72 which extends between such conduit portions 40a and 40b.

A small valve cylinder 73 is formed in valve housing 71 laterally adjacent passage 72, but communicating with passage 72 only where the latter is relatively adjacent to conduit portion 40a. A piston 74 is slidably mounted in the cylinder 73, being urged toward a seat 76 to cause blocking of flow of gas into passage 72 and thus into the power cylinder 13. Piston 74 is urged toward seated position by a helical compression spring 77, the setting of which may be adjusted by the turning of a threaded plug 78.

From the above it will be understood that the adjustment of plug 78, and thus the setting of spring 77, determines the pressure at which the piston 74 will be forced off the seat 76 by the hot air transmitted from the compressor cylinder through reservoir 39 into conduit portion 40a. The piston 74 remains off its seat until the pressure in reservoir 39, and in the adjacent conduit portion 40a, drops to a predetermined level which is sufficiently low that the piston 74 may again be pressed against its seat 76 by the spring 77. It is pointed out that the pressure at which piston 74 will again engage its seat 76 is relatively independent of the pressure in the passage 72, since the pressure surrounding the spring 77 in cylinder 73 is isolated by the piston from passage 72 and may be atmospheric.

The valve comprising housing 71, piston 74, etc., thus serves the function of insuring that the residual pressure in reservoir 39 will be of the desired value, which may be altered by merely adjusting the plug 78 and thus the pressure on spring 77.

The stem 79 of the above-mentioned poppet 42 extends slidably through cylinder head 10a of the power cylinder 13 and into a valve cylinder chamber 81 formed in the cylinder head. Mounted at the upper end of stem 79 is a piston 82, and the previously mentioned spring 44 is seated between the piston 82 and the bottom or end wall of chamber 81. A passage 83 extends from conduit portion 40b to the upper end of cylindrical chamber 81 adjacent a cover plate 84 thereon. Thus, the pressure in conduit portion 40b communicates through passage 83 with chamber 81 above piston 82. It will therefore be understood that the pressure in conduit portion 40b is present not only on the upper surface of the head of poppet 42, but also on the upper surface of piston 82, to provide a combined downward pressure which overcomes the force of spring 44 and also the pressure in cylinder 13 to effect opening of the poppet 42. This takes place at a much higher pressure in cylinder 13 than would be the case if piston 82 were not present.

By way of further explanation, it is pointed out that the hot air inlet poppet described in the above-cited prior patent application did not open until the spring pressure and also the pressure in the power cylinder (acting against the underside of the poppet head) were overcome by the pressure acting against the upper side of the poppet head only. It follows that it was necessary for the pressure in the power cylinder to drop to a relatively low value before the intake hot air poppet would open. With the present construction, on the other hand, the same poppet closing pressures are counteracted by the pressures not only on the upper surface of the poppet head, but also on the piston 82, which means that the poppet 42 opens at a higher pressure in power cylinder 13.

Operation

Assuming that the engine has been started, as described in the above-cited patent application, and is running in a normal manner, air is sucked into the compressor intake 22 and forced through conduit 23 and cooler 24 into compressor cylinder 12, under the control of poppet 27. Because of the shape of cam 33 on camshaft 32, intake poppet 27 is maintained opened during substantially the entire downstroke of compressor piston 14 and also during the initial portion of its upstroke. Compressed air from rotary compressor 18 is thus fed into the compressor cylinder continuously until the piston 14 has moved upwardly to block the uniflow exhaust conduit 35, so that the subsequent upward movement of piston 14 effects a very substantial additional compression of the air. The described inflow of air from rotary compressor 18 imparts a substantial amount of power to piston 14, and thus crankshaft 16, during piston downstroke; and the outflow of air through uniflow 35 when the piston is in its lower position has a desirable cooling effect and also operates to increase the efficiency of the turbocompressor.

Because of the 90 degree out-of-phase relationship between compressor piston 14 and its associated power piston 15 (the power piston being ahead of the compressor piston), the compressor piston will just be approaching its illustrated top dead center position at the same time that power piston 15 is moving downwardly and has completed almost half of its downstroke. The high pressure air present in compressor cylinder 12 during this latter portion of compressor piston upstroke will be forced past spring-loaded poppet 37 and through conduit 38, reservoir 39, conduit 40a, passage 72, and into conduit 40b. Because of the adjustment of spring 77 as determined by plug 78 and other factors, the hot air pressure is sufficient to force the piston 74 (Figure 2) off its seat 76 and cause entry of hot air into passage 72 and conduit portion 40b as indicated. A portion of the hot air is then transmitted through passage 83 into the upper end of valve cylinder 81. The combined downward pressure on the upper surface of piston 82 and on the upper surface of the head of poppet 42 effects opening of the poppet 42 after the explosion in cylinder 13 and after the power piston 15 has moved downward (subsequent to the explosion) a distance sufficient to reduce the pressure in power cylinder 13 until the poppet 42 may open.

As the power piston 15 continues on its downward stroke, the pressure in the power cylinder 13 continues to decrease. Also, the continued open condition of valve 74 causes lowering of the pressure in reservoir 39 and conduit portion 40a. It follows that piston 74 will reseat on its seat 76 when the pressure in conduit portion 40a has reduced to the predetermined value, after which the residual pressure in conduit portion 40b, passage 83, and the upper portion of cylinder 81 will bleed through the open poppet valve 42 into the cylinder 13.

When such bleeding has continued for a certain length of time, the pressure on the upper surface of piston 82 will be reduced to a point at which spring 44 will effect closing of poppet 42. The cycle then repeats itself upon a subsequent revolution of crankshaft 16.

The above-described operation effects opening of poppet 42 relatively soon after combustion in the power cylinder, so that the booster air from the compressor cylinder is introduced into the power cylinder to maintain a higher average pressure on the power piston 15 during the major portion of its downstroke. This, as previously indicated, has the effect of greatly increasing the efficiency of the engine.

It is pointed out that the piston 82 produces the effect of maintaining poppet 42 open without chattering, at all times when there is sufficient pressure in the conduit portion 40b and thus in the upper end of cylinder 81. Furthermore, piston 82 produces the effect of permitting a shorter travel of the poppet valve, and consequent faster operation thereof as compared to prior structures.

The above-mentioned explosion in the power cylinder results from a mixture with fuel of super-charged air flowing from compressor cylinder 12 through regulator valve 50, conduit 48, proportioning valve 47, conduit 49, and poppet 52 into the power cylinder. This air is mixed with fuel from a suitable fuel supply tank, not shown, and which flows through proportioning valve 47, fuel line 59, and fuel injector nozzle 58, under the control of piston 60 which is connected to the same rocker arm 55 that operates the poppet 52. The explosion occurs, due to a spark from plug 62, at approximately the time that power piston 15 is at top dead center. This results in a high pressure in the power cylinder 13, which forces the piston 15 downwardly. Such downward movement of the piston 15, however, rapidly reduces the pressure in the power cylinder to a value at which the poppet 42 opens as previously indicated. When the power piston 15 approaches bottom dead center, the exhaust poppet (unshown) is opened, and the uniflow exhaust 68 is also opened to effect rapid exhaust or scavenging of air and combustion products from both ends of the power cylinder.

Air and combustion products exhausted from the power cylinder and the compressor cylinder pass through uniflow outlets 35 and 68, and also exhaust conduit 64, to the inlet of turbine 17. These gases flow radially inwardly through the turbine rotor 19 and out exhaust conduit 45, such flowing through the turbine rotor effecting rotation of compressor rotor 20.

While the particular method and apparatus herein shown and disclosed in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

I claim:

1. In an engine, a compressor cylinder and a power cylinder, compressor and power pistons reciprocably mounted, respectively, in said cylinders and connected to a common output means, conduit means connecting said compressor cylinder to said power cylinder to effect introduction of compressed air into said power cylinder with consequent creation of a downward force on said power piston, and valve means to control the introduction of compressed air from said conduit means into said power cylinder; said valve means including a poppet valve and piston means to operate the same, and passage means to subject said piston means to the pressure in said conduit means.

2. The invention as claimed in claim 1, in which second valve means are interposed in said conduit means to maintain the pressure therein and upstream of said second valve means at a predetermined level between operative strokes of said compressor piston.

3. A combination hot air and internal combustion engine, which comprises compressor and power cylinders mounted at an angle relative to each other, compressor and power pistons mounted, respectively, in said cylinders and connected to a common crankshaft, said pistons being out of phase relative to each other whereby maximum compression is approached in said compressor cylinder during downstroke of the power piston in said power cylinder, conduit means directly connecting said compressor cylinder to said power cylinder, a poppet valve mounted at the end of said conduit means adjacent said power cylinder, the upper surface of the head of said poppet valve being subjected to the pressure in said conduit means, and the lower surface of the head of said poppet valve being subjected to the pressure in said power cylinder, means to define a valve piston chamber enclosing a portion of the stem of said poppet valve, a valve piston reciprocably mounted in said valve piston chamber and connected to said stem, and passage means to connect said conduit means to said valve piston chamber whereby the pressure transmitted through said passage means to said valve piston chamber is operative against said valve piston to augment the pressure exerted upon the upper surface of said poppet valve head to effect opening of said poppet valve.

4. The invention as claimed in claim 3, in which spring means are provided to bias said poppet valve toward seated position.

5. The invention as claimed in claim 3, in which a second valve is provided in said conduit means, and comprises a piston adapted to engage a seat and thus effect blocking of flow through said conduit means, and resilient means to bias said piston toward said seat against the pressure present in said conduit means between said second valve and said compressor cylinder.

6. A combination hot air and internal combustion engine, which comprises compressor and power cylinders mounted at a substantially 90 degree angle relative to each other, compressor and power pistons reciprocably mounted in said cylinders and connected to a common crankshaft located generally at the intersection of the axes of said cylinders, said compressor piston being approximately 90 degrees behind said power piston whereby said compressor piston approaches top dead center during downstroke of said power piston, conduit means connecting said compressor cylinder to said power cylinder directly, a spring-loaded unloader valve for said compressor cylinder and adapted to be opened upon creation of sufficient pressure in said compressor cylinder to permit transmission of hot compressed air from said compressor cylinder into said conduit means, a poppet valve having a head disposed at said power cylinder and subjected on its under side to the pressure in said power cylinder, the upper side of said poppet valve head being subjected to the pressure in said conduit means, means to define a valve cylinder chamber around a portion of the stem of said poppet valve, valve piston means mounted on said stem in said valve cylinder chamber, spring means mounted in said valve cylinder chamber and acting against said piston to urge said poppet valve to closed position preventing passage of air through said conduit means, and passage means to transmit compressed air from said conduit means to said valve cylinder chamber at the side of said valve piston means remote from said poppet valve head, whereby the pressure in said valve cylinder chamber acts against said valve piston means and co-operates with the pressure in said conduit means acting against said upper side of said poppet valve head to effect opening of said poppet valve despite the pressure of said spring and the pressure in said power cylinder.

7. The invention as claimed in claim 6, in which means are provided to introduce fuel and air into said power cylinder when said power piston is approaching top dead center position, and to effect explosion of said fuel and air when said power cylinder is near top dead center position, said poppet valve opening after said explosion but prior to exhausting of gases from said power cylinder to provide an increased mean effective pressure against said power piston during downstroke thereof.

8. The invention as claimed in claim 6, in which a valve housing is interposed in said conduit means and is provided with a valve passage connecting portions of said conduit means upstream and downstream from said valve housing, in which a valve cylinder is formed in said valve housing and substantially isolated from the pressures in said conduit means or in said valve passage, in which a valve piston is mounted in said valve cylinder and adapted to be seated against a seat effecting blocking of flow through said valve passage and thus through said conduit means, and in which spring means are provided to urge said piston toward seated position.

9. The invention as claimed in claim 8, in which means are provided to adjust the pressure of said spring means and thus the pressure at which said piston will be shifted away from seated position to permit flow of hot air through said valve housing due to pressure acting against said valve piston.

References Cited in the file of this patent

UNITED STATES PATENTS

| | | |
|---|---|---|
| 1,212,917 | De Long | Jan. 16, 1917 |
| 1,615,133 | Pescara | Jan. 18, 1927 |